UNITED STATES PATENT OFFICE.

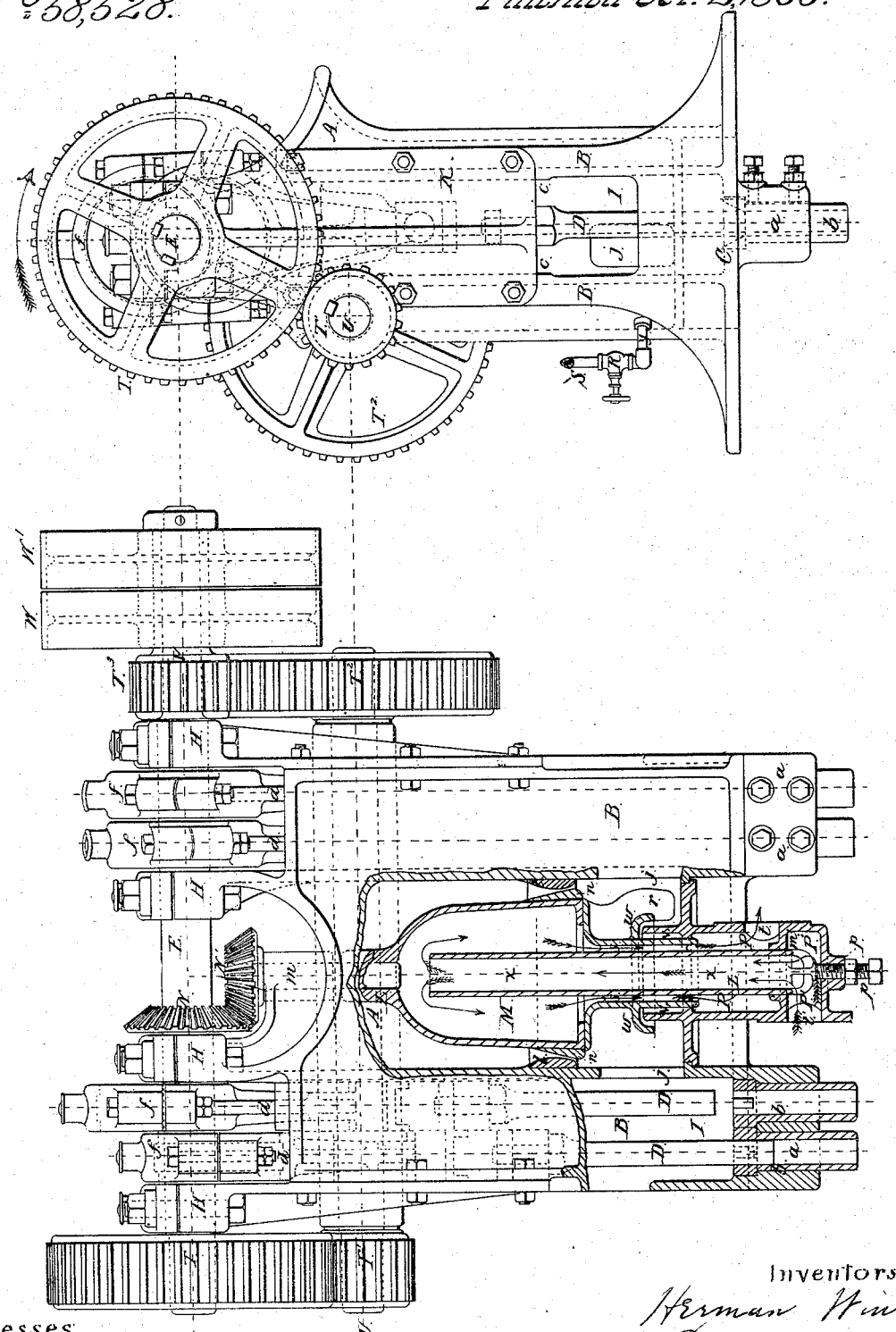

HERMAN WINTER, OF WILLIAMSBURG, NEW YORK, AND FREDERICK W. NEWTON, OF SOUTH ORANGE, NEW JERSEY.

IMPROVED MACHINE FOR PREPARING PEAT FOR FUEL.

Specification forming part of Letters Patent No. 58,528, dated October 2, 1866.

*To all whom it may concern:*

Be it known that we, HERMAN WINTER, of Williamsburg, in the State of New York, and FREDERICK W. NEWTON, of South Orange, in the State of New Jersey, have invented certain new and useful Improvements in Machinery for Solidifying Peat and other substances to which it may be applicable; and that the following is a full, clear, and exact description of our invention, reference being had to the accompanying drawings, in which—

Figure 1 represents a side elevation of a machine embodying our improvements, and Fig. 2 represents a face view of the same with certain parts removed, to show the internal construction of the machine.

The object of our invention is to simplify the construction and improve the operation of machines for solidifying peat. To this end the first part of our invention consists of the combination of one or more self-discharging ram or piston presses and the shaft for operating the ram or piston thereof with the chamber in which the material is prepared for the presses, in such manner that the said chamber constitutes a material part of the frame of the press or presses. The practical result of this improvement is that the material of the preparing-chamber contributes its strength to resist the strain of compressing the peat in the press or presses, and dispenses with the necessity of using as much material as would otherwise be required for that special purpose.

The object of the second part of our invention is to insure the pulverization of the material previous to the compression; and it consists of the combination of the preparing-chamber and press or presses of a peat-machine with grinding instruments operating, in connection with the said chamber, so that the material is ground to powder (more or less fine, as required) in its passage from the mouth of said chamber to the presses.

The object of the third part of our invention is to heat the peat in the preparing-chamber without the necessity of steaming it; and it consists of the combination of the preparing-chamber of the press with an internal heater into which a current of steam or of hot air may be admitted, so that the peat is heated by contact with said internal steam-heater.

The object of the fourth part of our invention is to combine the system of heating by means of an internal steam-heater with the operation of grinding or kneading of the peat; and it consists of the combination of the preparing-chamber and grinding or kneading instruments of a peat-machine with a heating-chamber so arranged that the material passes around its exterior to the movable grinding or kneading instruments, and with a pipe or passage for the admission of steam or other fluid into said internal heating-chamber.

The object of the fifth, sixth, and seventh parts of our invention is to combine means for steaming the peat with other members of our machine; and the fifth part of it consists of the combination, in a peat-machine, of the following instrumentalities, viz.: the preparing-chamber, press, grinding instruments, and pipe for the admission of steam into said preparing-chamber.

The sixth part of our invention consists of the combination, in a peat-machine, of the following instrumentalities, viz.: the preparing-chamber, press, internal heater, and pipe for the admission of steam into said preparing-chamber.

The seventh part of our invention consists of the combination, in a peat-machine, of the following instrumentalities, viz.: the preparing-chamber, press, grinding instruments, internal heater, and pipe for the admission of steam into said chamber, so that when this part of our invention is used, the peat or other material may be ground, heated by surface-contact, steamed and compressed, by a continuous operation.

The accompanying drawings represent a machine embodying all our improvements in the best form which we have thus far devised. The preparing-chamber A of this machine is a cylindrical vessel, and is arranged with its axis vertical. Its barrel is cast in one piece, with longitudinal lugs or ribs B B, which project laterally from its opposite sides, and terminate at their lower ends in feet C, which form the chambers *a a* of four piston or ram presses, two at each side of the preparing-chamber. For convenience of repair, each of these press-chambers is fitted with a lining, *b*, of chilled cast-iron, so that when one lining is worn away it may be readily replaced by another. Each of these presses has a ram or piston, D, which projects from a slide (seen in dotted lines in Figs. 1 and 2) that is constructed to slide in guides $c\ c$, formed upon the longitudinal ribs B B. Each of these slides is connected by an eccentric-rod, $d$, and band $f$ with an eccentric that is secured to a shaft, E, which is arranged to revolve in pillow-blocks H H H H, fitted to the upper part of the preparing-chamber, so that it, with the lugs or ribs, connects the press-chambers $a$ and press-shaft E, and resists the strain of compressing the material.

The presses are of the self-discharging ram variety, in which the material compressed at one stroke of the ram forms the bed against which the next succeeding charge of material is compressed, and in which, at each stroke, the compressed material is moved onward in the press-chamber and the portion farthest from the ram is ejected.

The preparing-chamber communicates with the press-chambers by passages I I, the orifices $j\ j$ of which may be fitted with slides to control the discharge from the preparing-chamber. The outer sides of the press-slides are covered with plates K, which retain the slides in their places.

The grinding instruments which we prefer to employ are a stationary and a revolving conical ring, the former, $l$, secured within the preparing-chamber, and the latter, $n$, secured to a shaft, L, which traverses said chamber and is sustained at its upper and lower extremities by suitable bearings $m\ m'$. These grinding instruments may be formed of chilled cast-iron, and may have their adjacent surfaces ribbed or grooved, like the grinding-surfaces of bark-mills. The fineness of grinding may be regulated by raising or lowering the central shaft, L, by means of a set-screw, $p$, whose upper end forms the pivot-and-thrust bearing for the shaft. This shaft is caused to revolve by connecting its upper end with the eccentric or press shaft E by means of beveled wheels N N, one secured to each shaft. As these grinding-surfaces are arranged above the bottom of the preparing-chamber A, the space beneath them forms a receptacle into which the ground material falls, and it is discharged from this receptacle by means of a wing, $r$, which is secured to the grinding-shaft L, revolves with it, and pushes the ground material, through the lateral orifices $j\ j$, into the passages I leading to the press-chambers.

In order that the third and fourth parts of our invention may both be embodied in the machine, the shaft L of the grinder is enlarged and made hollow, so as to form an internal chamber, M, into which steam may be admitted for the purpose of heating the material, while the chamber forms part of the shaft of the grinding instrument. This chamber communicates at its lower end, by means of a passage, $s$, with a steam-box, P, formed at the lower end of the preparing-chamber, so that the water condensed from the steam may escape from the internal heating-chamber into said steam-box, and be discharged from the latter through a nozzle, $t$, to which a pipe may be applied to conduct it away from the machine. The opening through which the steam-passage $s$ passes is formed like a stuffing-box, $v$, so that it may be packed to prevent the escape of steam into the peat. A collar, $w$, also is formed upon the hollow shaft, to overlap the stuffing-box and prevent the ground peat from entering it.

In order to supply steam to the internal heating-chamber, the shaft is made hollow to form an internal passage, $x$, whose lower end passes out through the steam-box P into a second box, P', and communicates with the latter by openings surrounding the socket which receives the bearing-pivot $p$. This lower steam-box is provided with a nozzle, $t'$, which may communicate with the exhaust-pipe of the steam-engine employed to drive the machine, so that the heat may be derived from the exhaust-steam; or the nozzle may communicate directly with a steam-boiler by means of a pipe; or it may be connected with a hot-air furnace, so that the internal heating-chamber may be heated by a current of hot air passed through it in the direction of the arrows in Fig. 2.

In order to steam the peat, a steam-pipe, $y$, is fitted to the preparing-chamber, so that steam may be discharged into the peat contained therein. This steam-pipe is fitted with a globe-valve, R, or other means of regulating the quantity of steam, and communicates with a main, S, proceeding from a steam-boiler or other source of steam.

The press-shaft of the machine thus described may be driven by applying the crank of a steam-engine directly to one of its ends, or it may be operated as represented in the drawings, by connecting it by cog-wheels T T' with a counter-shaft, U, that passes through a tubular casing secured to the preparing-chamber A, the counter-shaft being connected by cog-wheels $T^2\ T^3$ with a sleeve, V, that is arranged to turn upon one end of the press-shaft E, and is fitted with a fast belt-pulley, W, and a loose one, $W^1$, to receive a belt from the prime mover. In this mode of transmitting power to the press-shaft, the friction of the sleeve of the fast pulley on the press-shaft tends to turn the latter, and is not an entire loss of power. As there are four presses in the machine, the eccentrics are arranged with their greatest projections at four points of a circle equidistant from each other, so that the strain is divided as equally as possible upon the press-shaft and prime mover. If deemed expedient cranks or cams may be substituted for the eccentrics, and a fly-wheel may be added to the machine to equalize the strain upon the belt and prime mover.

In the operation of this machine, dried peat may be delivered into the upper end or mouth of the preparing-chamber by an elevator or by other means, and if all the members of the machine are used, the peat, in its passage through the machine, will be heated by contact with the internal heater, ground by the grinders, steamed, (by steam admitted through the steam-pipe,) and compressed and ejected in a solidified state by the presses. Moreover, as the means for grinding are combined with the internal heater, the peat is distributed in a thin sheet over the heating-surface, and, consequently, every part of it is thoroughly heated. Besides, as the steam is admitted into the receptacle beneath the grinder, into which the peat falls in a species of shower of coarse powder, the steam (when steaming is performed) is thoroughly applied to and commingled with the peat previously to pressing.

If the third part of our invention is to be used without the second part thereof, the grinders $l\ n$ will not be used; but radiating arms may then be fixed to the periphery of the internal heating-chamber, so as to knead the material while it is heated. So, also, if the first part of our invention is not to be used, the presses need not be applied directly to the preparing-chamber, but may be separated from it and connected or combined with it by spouts for the prepared material, or by conveyers or elevators, to move the material from the chamber to the press or presses as required. We believe that the best result will be attained by combining the requisite means to embody all parts of our invention in the same machine, although, if deemed expedient, some parts may be used without others, as above indicated.

What we claim as our invention, and desire to secure by Letters Patent, is—

1. The combination, in a peat-machine, of the preparing-chamber and press, in such manner that the material of the former constitutes a part of the frame of the press, substantially as set forth.

2. The combination, in a peat-machine, of the following instrumentalities, viz: The preparing-chamber, grinding instruments, and press, all operating in combination, substantially as set forth.

3. The combination, in a peat-machine, of the following instrumentalities, viz: The preparing-chamber, internal heater, and press, all operating in combination, substantially as set forth.

4. The combination, in a peat-machine, of the following instrumentalities, viz: The preparing-chamber, grinding or kneading instruments, internal heater, and passage thereto, all operating in combination, substantially as set forth.

5. The combination, in a peat-machine, of the following instrumentalities, viz: The preparing-chamber, press, grinding instruments, and pipe for admitting steam into the preparing-chamber, all operating in combination, substantially as set forth.

6. The combination, in a peat-machine, of the following instrumentalities, viz: The preparing-chamber, press, internal heater, and pipe for admitting steam into the preparing-chamber, all operating in combination, substantially as set forth.

7. The combination, in a peat-machine, of the following instrumentalities, viz: The preparing-chamber, press, grinding instruments, internal heater, and pipe for the admission of steam into the preparing-chamber, all operating in combination, substantially as set forth.

HERMAN WINTER.
F. W. NEWTON.

Witnesses:
MELVILLE BIGGS,
E. S. RENWICK.